(12) United States Patent
Van Aken et al.

(10) Patent No.: US 11,040,602 B2
(45) Date of Patent: Jun. 22, 2021

(54) COMPOSITE HYBRID ROOF FRAME AND METHODS TO PRODUCE THE SAME

(71) Applicant: SABIC GLOBAL TECHNOLOGIES B.V., Bergen op Zoom (NL)

(72) Inventors: Harold Van Aken, Amstenrade (NL); Sandeep Chandrakant Kulkarni, Maastricht (NL); Warden Schijve, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 88 days.

(21) Appl. No.: 16/478,163

(22) PCT Filed: Jan. 18, 2018

(86) PCT No.: PCT/IB2018/050316
§ 371 (c)(1),
(2) Date: Jul. 16, 2019

(87) PCT Pub. No.: WO2018/134762
PCT Pub. Date: Jul. 26, 2018

(65) Prior Publication Data
US 2019/0366815 A1    Dec. 5, 2019

Related U.S. Application Data

(60) Provisional application No. 62/447,782, filed on Jan. 18, 2017.

(51) Int. Cl.
*B60J 7/02* (2006.01)
*B60J 7/00* (2006.01)
*B60J 7/043* (2006.01)

(52) U.S. Cl.
CPC ............. *B60J 7/022* (2013.01); *B60J 7/0084* (2013.01); *B60J 7/043* (2013.01)

(58) Field of Classification Search
CPC ... B60J 7/02; B60J 7/043; B60J 7/0435; B60J 7/0015; B60J 7/0084
(Continued)

(56) References Cited

U.S. PATENT DOCUMENTS

| 4,422,687 A | 12/1983 | Kaltz et al. |
| 6,786,537 B2* | 9/2004 | Allan ................... B60J 7/022 296/213 |

(Continued)

FOREIGN PATENT DOCUMENTS

| DE | 4012635 A1 | 10/1991 |
| DE | 29705440 U1 | 8/1998 |

(Continued)

OTHER PUBLICATIONS

"Panoramic Sunroof Frame"; Hyundai Motor Group 2015 Kia Sorento CUV; Global IP News: Automobile Patent News; one page.
(Continued)

*Primary Examiner* — Dennis H Pedder
(74) *Attorney, Agent, or Firm* — Cantor Colburn LLP

(57) ABSTRACT

Roof frames and methods of making the same are disclosed. Roof frames may comprise at least a first, second, third, and fourth structures. One or more of the structures may comprise a first surface formed from a first continuous fiber composite comprising a multidirectional laminate. At least one of the first, second, third, and fourth structures may comprise a second surface formed from a second continuous fiber composite comprising a unidirectional laminate, wherein the first surface and the second surface are selected to be formed from the first continuous fiber composite and the second continuous fiber composite, respectively, based at least upon a stress analysis for the respective surface, wherein the first surface exhibits a higher stress profile as compared to the second surface.

18 Claims, 7 Drawing Sheets

(58) Field of Classification Search
USPC ............. 296/216.06–216.08, 213, 214
See application file for complete search history.

(56) References Cited

U.S. PATENT DOCUMENTS

| | | | |
|---|---|---|---|
| 7,086,682 B2* | 8/2006 | Neaux ................ | B60J 7/0015 160/107 |
| 2008/0073943 A1 | 3/2008 | Pollak et al. | |
| 2010/0084894 A1* | 4/2010 | Billy ................... | B60J 1/001 296/221 |
| 2011/0020572 A1 | 1/2011 | Malek et al. | |
| 2011/0203481 A1* | 8/2011 | Komaki ............. | B23K 26/037 105/396 |
| 2014/0084636 A1* | 3/2014 | Wimmer ............ | B29C 45/1418 296/216.07 |
| 2015/0343887 A1 | 12/2015 | Bojanowski et al. | |
| 2016/0052377 A1 | 2/2016 | Kiesewetter et al. | |
| 2016/0214346 A1* | 7/2016 | Hatanaka ............ | B32B 5/18 |

FOREIGN PATENT DOCUMENTS

| | | |
|---|---|---|
| DE | 10135406 A1 | 2/2003 |
| DE | 29924726 U1 | 3/2005 |
| EP | 1325862 A2 | 7/2003 |
| EP | 1459881 A2 | 9/2004 |
| EP | 2671779 A1 | 12/2013 |
| KR | 2016-0133605 A | 11/2016 |
| WO | WO 2010/066213 A2 | 6/2010 |
| WO | WO 2012/126790 A2 | 9/2012 |
| WO | WO 2012/132745 A1 | 10/2012 |
| WO | WO 2014/166733 A1 | 10/2014 |
| WO | WO 2017/152980 A1 | 9/2017 |

OTHER PUBLICATIONS

International Patent Application No. PCT/IB2018/050316; Int'l Search Report and the Written Opinion; dated Mar. 16, 2018; 19 pages.
International Patent Application No. PCT/IB2018/050316; Int'l Preliminary Report on Patentability; dated Aug. 1, 2019; 12 pages.

* cited by examiner

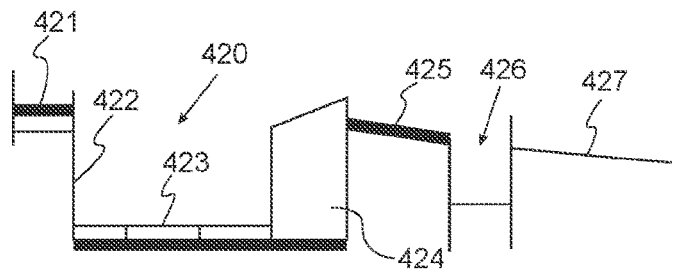
FIG. 4A
SECTION A-A
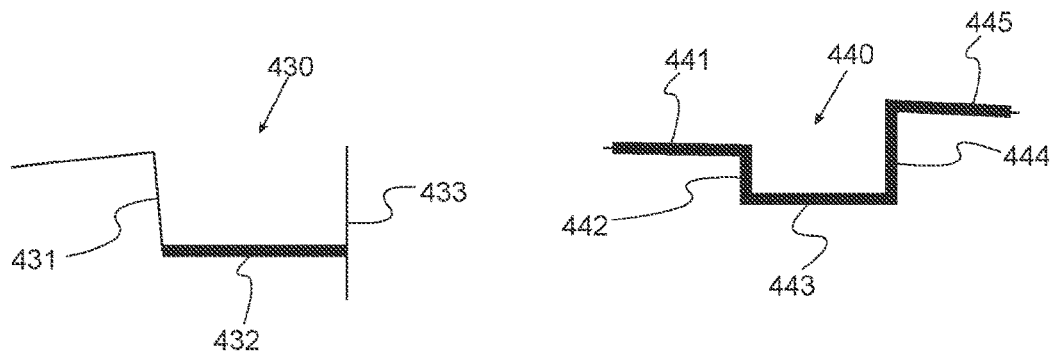
FIG. 4B
SECTION B-B
FIG. 4C
SECTION C-C
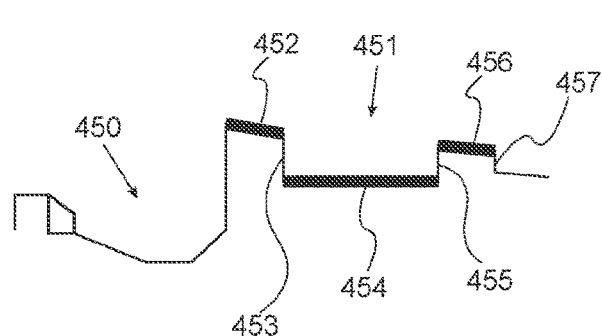
FIG. 4D
SECTION D-D
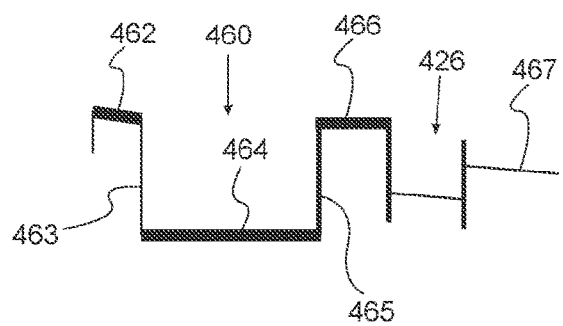
FIG. 4E
SECTION E-E

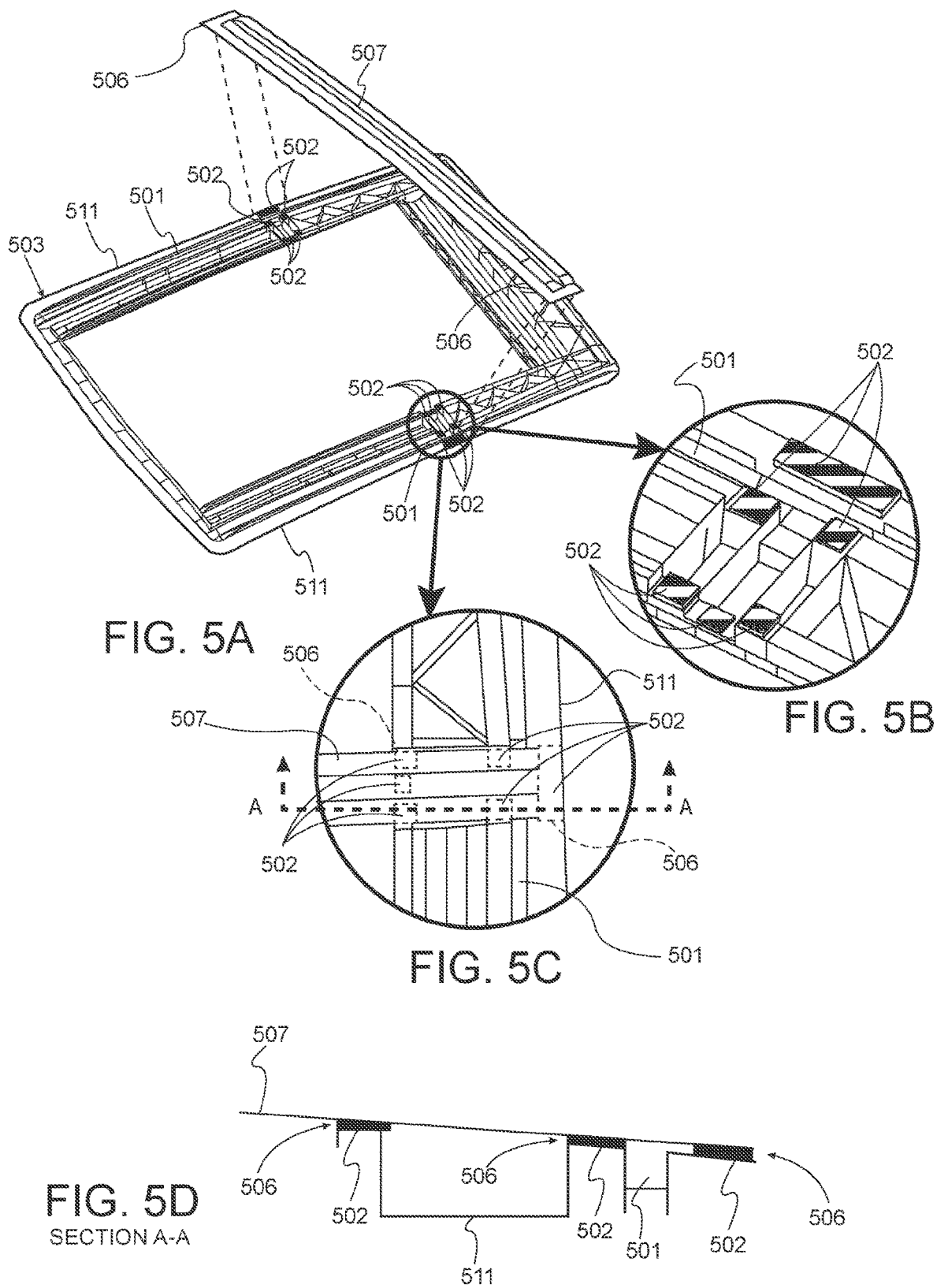

COMPOSITE HYBRID ROOF FRAME AND METHODS TO PRODUCE THE SAME

CROSS-REFERENCE TO RELATED APPLICATION

This application is the National Stage of International Application No. PCT/IB2018/050316 filed Jan. 18, 2018, which claims the benefit of U.S. Provisional Application No. 62/447,782 filed Jan. 18, 2017, the disclosures of which are incorporated herein by this reference in their entireties.

TECHNICAL FIELD

This disclosure pertains generally, but not by way of limitation, to roof frames. More specifically, the present disclosure is related to composite hybrid roof frames and methods for the production of the composite hybrid roof frames.

BACKGROUND

The automotive industry and original equipment manufacturers are constantly seeking to reduce the weight of structural components of automobiles. Tightening carbon dioxide emissions standards put pressure on manufacturers to develop lighter vehicles.

One vehicle component that may add substantial weight to the body of a vehicle is a roof panel, such as a sun roof or a hatch. The frame (e.g., roof frame) that supports a roof panel specifically accounts for a significant portion of the vehicle's weight. The task of designing a lighter weight roof frame poses a challenge for manufacturers due to mechanical requirements, spatial constraints, and cost constraints. Roof frames are traditionally made primarily of steel or other metals. Manufacturers and engineers have attempted to make frames using a range of alternative materials to steel, including aluminum, plastic, and composite. However, improvements in roof frame designs are needed

SUMMARY

The present disclosure relates to roof frames. Such roof frames may be configured to support at least a portion of a roof panel such as a sun roof, moon roof, metal panel, and/or systems configured to control such roof panels. A roof frame may comprise a composite hybrid material. The composite hybrid material offers various advantages over traditional metal roof frames. A composite hybrid frame may have less weight (e.g., may be lighter) than traditional metal frames, such as substantially similar frames consisting essentially of the same components, but formed from metal such as steel. A reduction in weight of the roof frame (and/or related assemblies) may influence the center of gravity of the vehicle, which may impact dynamic stability. A composite hybrid frame may be more durable than traditional metal frames, such as more resistant to corrosion and fatigue than traditional metal frames. In addition, the process of making a composite hybrid frame allows design freedom, such as the integration of functions or components of a vehicle roof or roof panel. Also, a composite hybrid frame may save on assembly costs. Further, a composite hybrid frame may facilitate easier recycling as compared to a traditional frame made only of metal.

Despite its lighter weight, a composite hybrid frame according to aspects of the present disclosure may be configured to mechanically perform as well as traditional metal frames. Composite hybrid frames exhibit sufficient strength and stiffness under static and dynamic loads. Composite hybrid frames may be spatially compact and meet installation space constraints.

A composite hybrid or hybrid composite may comprise a continuous fiber composite and a polymeric resin. The continuous fiber composite may be organic sheet, unidirectional laminate, multidirectional laminate, or any other thermoplastic laminate. The fibers in the continuous fiber composite may be carbon, glass, aramid or fabric, for example. The laminate may be a hybrid laminate. The fibers in the laminate may be unidirectional or multidirectional. The laminate may have a uniform or variable laminate orientation. The laminate may have a symmetric or unsymmetric laminate orientation. The polymeric resin may be a filled or unfilled thermoplastic material. Examples of thermoplastics that could be used include polypropylene, nylon 6, nylon 66, or polycarbonate-ABS, or any other suitable thermoplastic or combination thereof. The polymeric resin may comprise a polymeric resin matrix. The polymeric resin matrix may serve as a foundation of the frame. The continuous fiber composite may be embedded in the polymeric resin matrix. The polymeric matrix may support the continuous fiber composite by providing a reinforcement layer and holding the continuous fiber composite in a stable position. The continuous fiber composite may be selectively placed in regions of the frame to optimize the weight, strength, and stiffness of the frame. The location of continuous fiber composite in the frame and the orientation of the fibers in the continuous fiber composite determine the physical properties of the frame, at least in part.

The composite hybrid frame may be manufactured with an injection molding machine by a one-shot overmolding process or a two-shot overmolding process. In the one-shot process, a composite hybrid frame with an integrally formed crossbeam is created in an injection molding machine. In the two-shot process, a composite hybrid frame without a crossbeam is created in an injection molding machine before an individually-formed crossbeam is attached to the frame. The two-shot overmolding process may achieve the formation of lighter frames than the one-shot overmolding process. The two-shot overmolding process allows for more freedom in frame design, including the potential to optimize the geometric configuration of the frame. For example, a frame manufactured with the two-shot overmolding process may be designed with a crossbeam that bridges a drain channel, whereas a frame to be manufactured by the one-shot overmolding process may be challenging to design with a crossbeam that bridges the drain channel.

A composite hybrid frame may support a roof panel. The roof panel may include one or more fixed panels or movable panels, such as a sliding panel. The roof panel may include a combination of fixed and movable panels. The roof panel can be made of any suitable material, such as glass. The roof panel can be attached to the frame by any suitable means. For example, a fixed panel may be glued to a frame.

Additional components of a roof panel such as a retractable screen cassette or guide rails or a system to control a roof panel may be affixed to a composite hybrid frame by any appropriate means, such as with screws or glue. A composite hybrid frame may be designed with pockets or regions to receive or attach to additional components of a roof panel, such as a cable routing or a latch.

A composite hybrid frame, as described herein, may be installed in a vehicle, using any appropriate installation methods. The frame may be secured to the body in white of a vehicle, at the stage of manufacture in which sheet metal has been welded together.

This overview is intended to provide an overview of subject matter of the present patent application. It is not intended to provide an exclusive or exhaustive explanation of the present devices or techniques. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document. In the drawings:

FIGS. 4A, 4B, 4C, 4D, and 4E show cross-sectional views across lines A-A, B-B, C-C, D-D, and E-E respectively of the exemplary composite frame in FIG. 4.

FIG. 5A illustrates an exemplary open composite hybrid frame formed with the two-shot overmolding process and an individually-formed crossbeam.

FIG. 5B is a close-up view of a region of the exemplary open frame in FIG. 5

FIG. 5C is an enlarged view of a region of the exemplary open frame in FIG. 5 with a crossbeam attached.

FIG. 5D shows a cross-sectional view across line A-A in FIG. 5C.

DETAILED DESCRIPTION

Aspects of the disclosure will now be described in detail with reference to the drawings. Like numerals refer to like elements throughout the figures and description. Certain terminology is used in the following description for convenience only and is not limiting. The term "plurality", as used herein, means more than one. The terms "a portion" and "at least a portion" of a structure each include the entirety of the structure. Certain features of the disclosure that are described herein in the context of separate examples may also be provided in combination in a single example. Conversely, various features of the disclosure that are described in the context of a single example may also be provided separately or in any sub-combination.

Figure 1A:
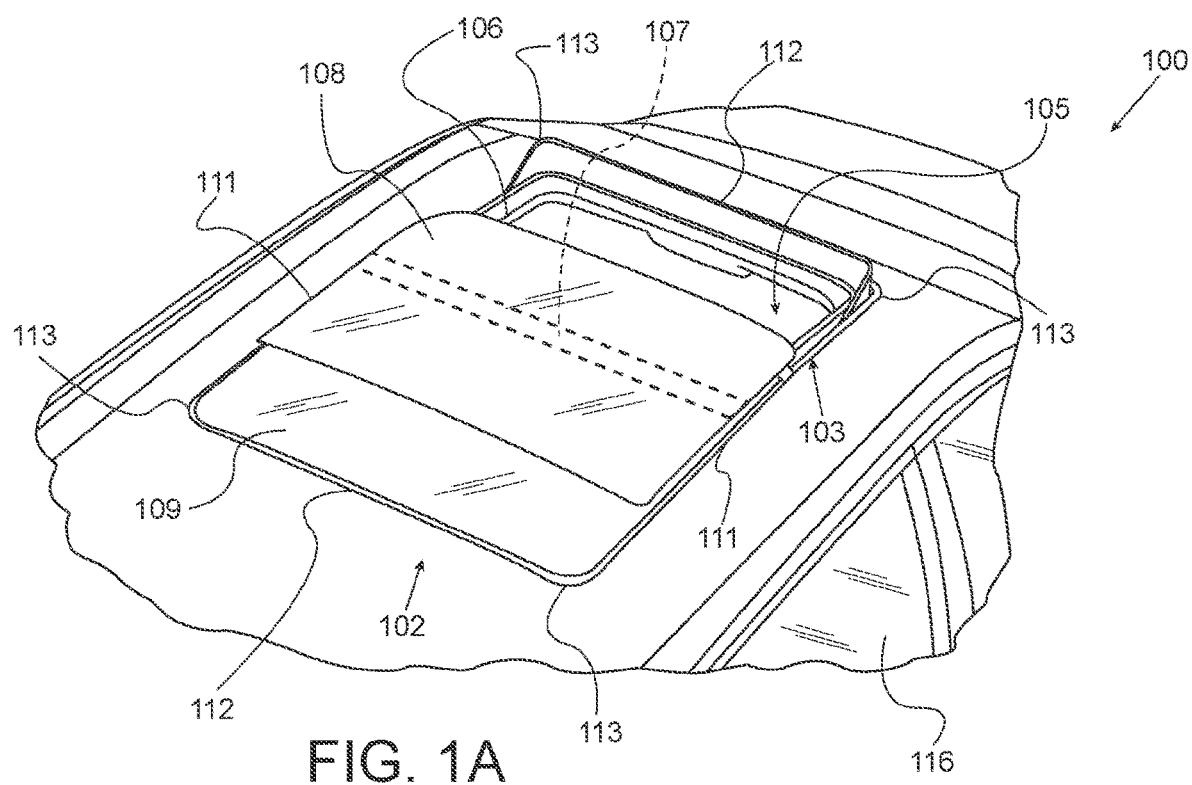
FIG. 1A illustrates an exemplary frame supporting an exemplary roof panel in an exemplary environment.

FIG. 1A depicts an exemplary vehicle 100 with an exemplary roof frame assembly 102. Although the exemplary vehicle 100 in FIG. 1A is illustrated as an automobile (e.g., car), the vehicle 100 may be an aircraft, a boat, a train, a tractor, or an automobile, including but not limited to a truck, a bus, or a mobile home, for example. As shown in FIG. 1A, the roof frame assembly 102 may be configured to support at least a portion of a roof panel 108, 109. The roof panel 108, 109 may be, by example and not limitation, a hatch, a sun roof panel, a moon roof panel, or a combination thereof. A sun roof panel may comprise a substantially opaque sheet of material, such as metal or fabric. A moon roof panel may comprise a substantially transparent sheet of material, such as glass or a fabric screen. A hatch may comprise a door that opens by sliding, turning about a hinge, or by any other opening mechanism. A sun roof panel or a moon roof panel may be a type of hatch. The roof frame assembly 102 may comprise a portion that is a hatch and a portion that is not operable to open, for example. The roof panel 108, 109 may be fixed. The roof frame assembly 102 may be configured to support at least a portion of more than one roof panel 108, 109. As illustrated in FIG. 1A, the exemplary roof frame assembly 102 supports a roof panel 108 that is operable to slide and a roof panel 109 that is disposed in a fixed position. The roof frame assembly 102 may comprise structural elements and operational elements such as electrical, mechanical, and electro-mechanical system components configured to operate a moveable portion of the roof frame assembly 102.

Figure 1B:
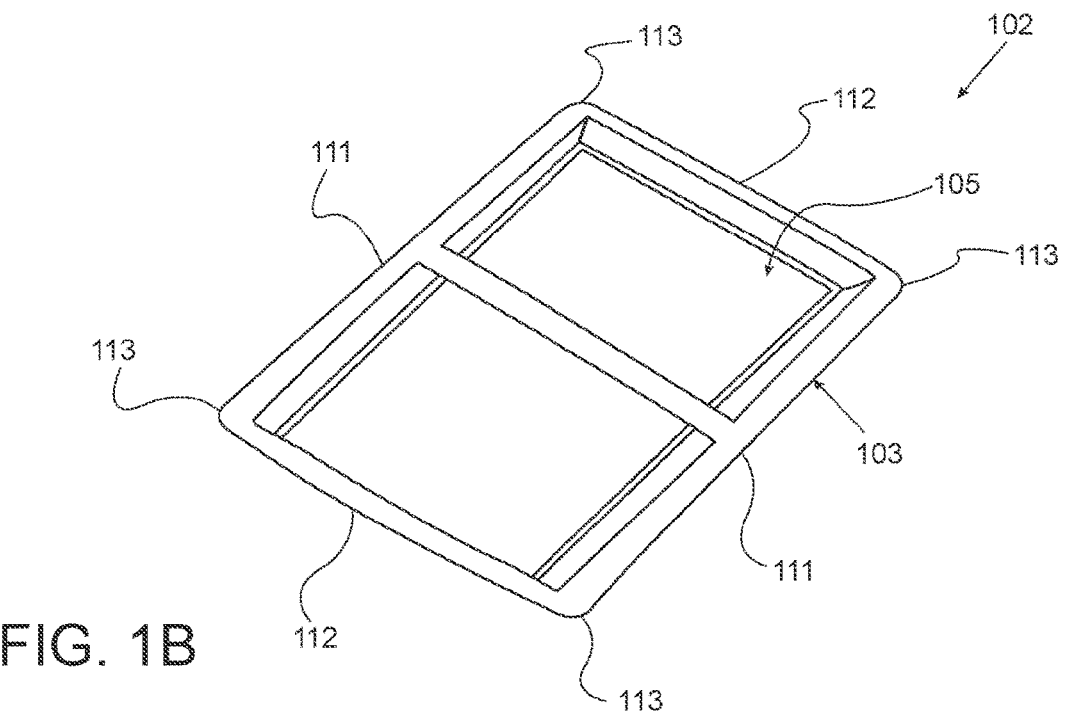
FIG. 1B illustrates an exemplary frame.

The roof frame assembly 102 may comprise a roof frame 103 that may support at least a portion of the roof panel 108, 109. Referring to FIGS. 1A and 1B, the roof frame 103 may define at least a portion of an aperture 105. The aperture 105 may be configured to receive at least a portion of the roof panel 108, 109, such as a sheet of glass or metal. The aperture 105 may be positioned between an interior compartment 116, such as a passenger compartment or a cargo compartment, of the vehicle 100 and the elements outside the vehicle 100. When exposed, the aperture 105 may facilitate fluid communication between an exterior and an interior of the vehicle 100.

The roof frame 103 may comprise a pair of longitudinal side portions 111 that each comprises a structure (e.g., support structure) disposed on opposite sides of the aperture 105. The roof frame 103 may further comprise lateral end portions 112 that are configured to be coupled between each of the longitudinal side portions 111. One or more of the lateral end portions may be disposed orthogonally to one or more of the longitudinal side portions 111. However, other configurations may be used such as angles larger or smaller than 90 degrees relative to a joint of the lateral end portions 112 and the longitudinal side portions 111. Each lateral end portion 112 may comprise a structure (e.g., support structure) disposed adjacent the aperture 105 at an end of the longitudinal side portions 111. The roof frame 103 may comprise a set of corners 113, wherein one or more of the corners 113 are defined at the intersection of a longitudinal side portion 111 and a lateral end portion 112. Other configurations may be used.

The roof frame 103 may comprise at least one crossbeam 107. The crossbeam 107 may comprise a support structure such as an omega structure. The crossbeam 107 may be disposed between the lateral end portions 112. The crossbeam 107 may extend from one longitudinal side portion 111 to another longitudinal side portion 111 across at least a portion of the aperture 105. The crossbeam 107 may comprise a strip, an omega-shaped cross-section, a hat-shaped cross-section, or an H-shaped cross-section. Other cross-sectional shapes and configurations may be used to provide a desired stress profile.

Depicted in FIG. 1A, the roof panel 108, 109 may be or comprise a cover member such as a plate, planar sheet, window, or the like. The roof panel 108, 109 may be attached to the roof frame 103 by a connecting assembly 106, such as a guide rail or a hinge. The connecting assembly 106 may be disposed on or adjacent at least one of the longitudinal side portions 111. The connecting assembly 106 may be disposed on at least one of the lateral end portions 112. The roof panel 108, 109 may be a glass pane, a fabric sheet, a metal sheet or any other piece of any other material that is operable to cover at least a portion of the roof frame 103. The roof panel 108, 109 may be retractable and may be spooled by a cassette. The cassette may be attached to the roof frame 103, for example, on a lateral end portion 112. The roof panel 108, 109 may be disposed in one of various places on the roof frame assembly 102 and/or on the roof frame 103. The roof panel 108, 109 may be situated on top of the roof frame assembly 102. The roof panel 108, 109 may be disposed inside the aperture 105.

Additionally or alternatively, the roof frame assembly 102 may comprise a wind deflector (not shown). The wind deflector may be a fin or a shield. The wind deflector may be connected to at least one of the lateral end portions 112. The wind deflector may be connected to at least one of the longitudinal side portions 111.

According to an aspect of the disclosure, the roof frame assembly 102 may present a low profile substantially in the plane of the roof frame 103.

The roof panel 108, 109 may be manufactured independently from the roof frame assembly 102 and the vehicle 100. The roof panel 108, 109 may be installed in an opening in the roof frame assembly 102 in the vehicle 100. The roof panel 108, 109 may be installed in the roof frame assembly 102 when the vehicle 101 is in a body in white phase. The roof panel 108 may be affixed to the roof frame assembly 102 using any appropriate means, such as with a welding technique or a gluing technique.

Figure 2:
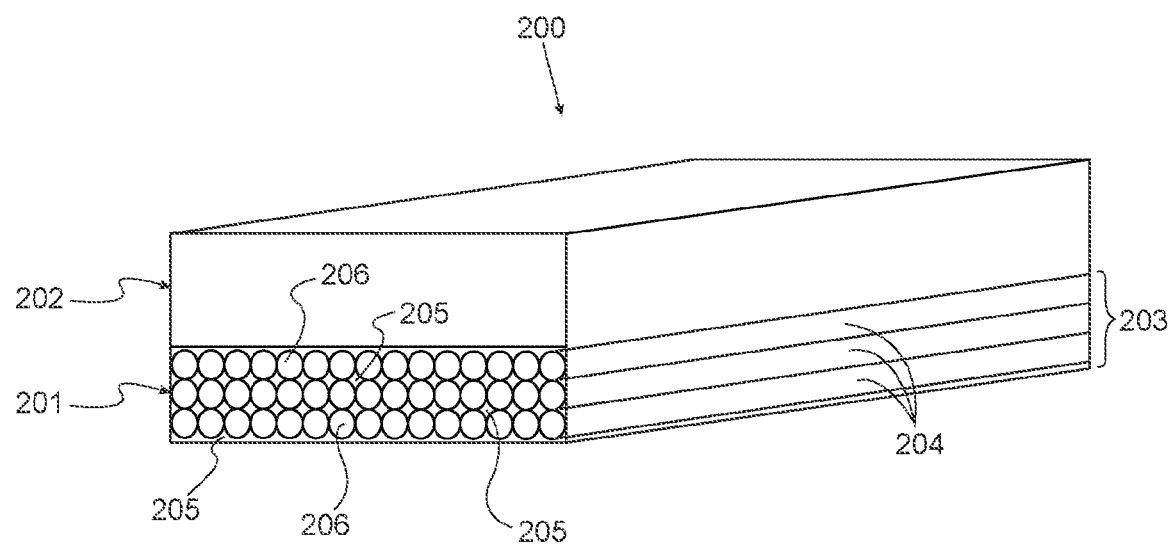
FIG. 2 is an enlarged view of a cross-section of a composite hybrid material including a continuous fiber composite and a polymeric resin.

As described herein, one or more surfaces and/or components of a roof frame (e.g., roof frame 103 (FIGS. 1A-1B)) may be formed from a composite hybrid material. With reference to FIG. 2, a composite hybrid 200 comprises a continuous fiber composite 201 and a polymeric resin 202. A portion of the frame (e.g., roof frame 103 (FIGS. 1A-1B)) may comprise a continuous fiber composite 201 and a polymeric resin 202. However, not all portions of the frame must comprise both a continuous fiber composite 201 and a polymeric resin 202. A portion of the frame may comprise continuous fiber composite 201 and no polymeric resin 202. A portion of the frame may comprise a polymeric resin 202 and no continuous fiber composite 201. In at least some portions of the frame, the continuous fiber composite 201 may be bonded to the polymeric resin 202.

As shown in FIG. 2, the continuous fiber composite 201 may comprise a laminate 203. The laminate 203 may comprise one or more plies 204. A ply 204 may comprise a layer of a thermoplastic matrix 205 reinforced by fibers 206. The laminate 203 may be a hybrid laminate, comprising one or more plies 204 wherein one ply 204 comprises different materials than another ply 204. For example, one ply 204 of a hybrid laminate may comprise a different thermoplastic or different fibers 206 than another ply 204 of the hybrid laminate. Also, for example, one ply 204 of a hybrid laminate may have a different fiber content than another ply 204 of the hybrid laminate. Alternatively, a laminate 203 may comprise one or more plies 204 that comprise the same materials.

The laminate 203 may have a defined laminate orientation. The laminate orientation refers to the direction of the fibers 206 in the plies 204 of the laminate 203. For example, in FIG. 2 the laminate 203 is a unidirectional laminate. A unidirectional laminate may comprise a plurality of plies 204 wherein each ply 204 is oriented such that its fibers 206 are substantially parallel to the fibers 206 of the other plies 204. A unidirectional laminate may comprise a single ply 204. In certain aspects, the laminate 203 may have an orientation such that the fibers 206 are configured along a critical load path (e.g., a surface or path that is modeled or known to experience loads over a certain threshold) of a component.

Figure 3:
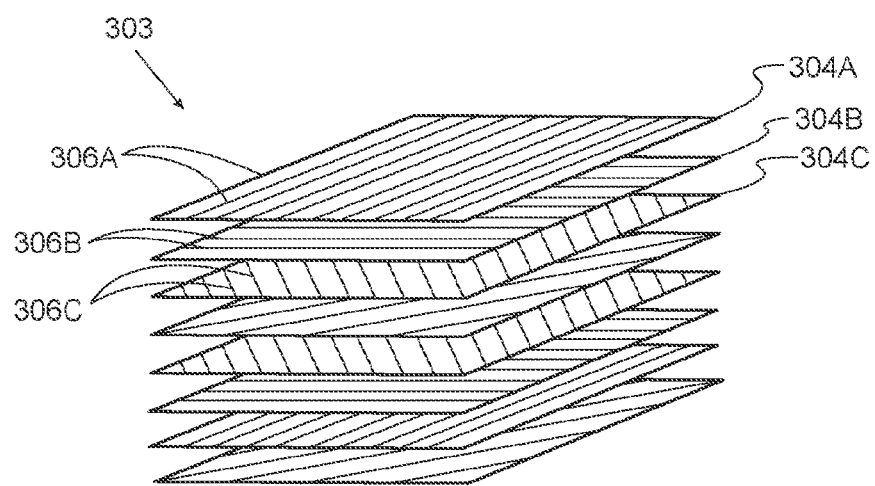
FIG. 3 is an exploded view of plies of a laminate of a continuous fiber composite.

In other instances, as exemplified in FIG. 3, a laminate 303 may have a laminate orientation defined by a plurality of plies 304 which are stacked such that the direction of fibers 306 of at least one ply 304 crosses fibers 306 of at least another ply 304 at a non-zero angle. In FIG. 3, the exemplary fibers 306A of ply 304A cross the fibers 306B of ply 304B at a ±90° angle. The exemplary fibers 306C of ply 304C cross the fibers 306B of ply 304B at a ±45° angle. A laminate 303 may have a uniform laminate orientation, where each ply 304 in the laminate is in contact with another ply 304 in the laminate 303 such that the fibers 306 of the plies 304 cross at a specific angle. Such an angle may be between 0 and 180 degrees and may include any relative cross angle. A laminate 303 can have a variable laminate orientation, where the plies 304 in the laminate 303 are contacting plies 304 such that their fibers 306 cross at a specific angle. For example, the laminate 303 in FIG. 3 illustrates a variable laminate orientation, where the fibers 306A of ply 304A cross the fibers 306B of ply 304B at a ±90° angle, but the fibers 306C of ply 304C cross the fibers 306B of ply 304B at a ±45° angle. A laminate 303 may have a symmetric laminate orientation, where the plies 304 above a mid-plane are a mirror image of the plies 304 below the mid-plane. The mid-plane refers to a plane forming the mid-line of a laminate. A laminate 303 may have an unsymmetric laminate orientation, where the plies 304 above the mid-plane are not a mirror image of the plies 304 below the mid-plane. The strength and stiffness of a continuous fiber composite is determined, at least in part, by the laminate orientation of the constituent laminate. Such orientation configuration may be selected to provide a custom support or strength profile for a particular end use.

A laminate may have a fiber content of 30-70% by volume; however, other fiber volumes are possible. A laminate may have a desired thickness. For example and not limitation, a laminate may have a thickness in the range of 0.5 mm to 4 mm.

A laminate may comprise organic sheets, fabric, unidirectional tapes (e.g., UDMAX tapes manufactured by SABIC) or any other thermoplastic laminate or combination thereof. Referring to features depicted in FIG. 2, the fibers 206 in laminate 203 may be, by way of example and not limitation, carbon fibers, fabric fibers, glass fibers, or aramid fibers or a combination thereof. The thermoplastic in the matrix 205 may be, by example and not limitation, polyethylene terephthalate (PET), a polycarbonate (PC) family of polymers, polybutylene terephthalate (PBT), poly (1-,4-cyclohyexylidene cyclohexane-1,4-dicarobxylate) (PCCD), co-polymers thereof or blends thereof. The thermoplastic in the matrix 205 may comprise additives. Non-exhaustive examples of additives include coupling agents, antioxidants, heat stabilizers, flow modifiers, colorants or any combinations thereof.

The polymeric resin 202 may be a filled thermoplastic, like short or long discontinuous glass fiber-filled polypropylene (e.g., STAMAX made by SABIC), or an unfilled thermoplastic. A filled thermoplastic could comprise a filler such as butadiene, aluminum powder, glass, carbon, or any high performance filler or combination thereof. The polymeric resin 202 may have a fiber content between 10-70% by weight, however other fiber contents are possible. The base thermoplastic of the polymeric resin 202 may be PP, PA6, PA66, PC+ABS, or any other suitable thermoplastic or combination thereof. According to one aspect of the present disclosure, the polymeric resin 202 and the thermoplastic matrix 205 of the laminate 203 comprise the same thermoplastic, which could enhance bonding between the polymeric resin 202 and the laminate 203.

Figure 4:
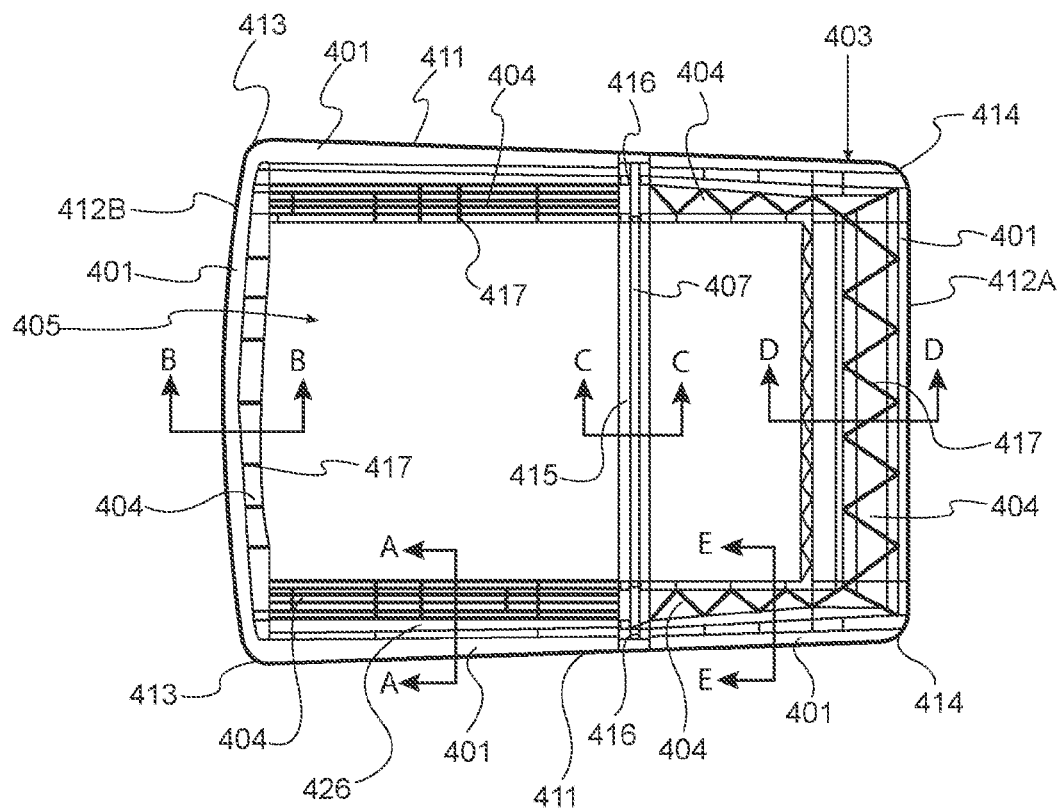
FIG. 4 illustrates an exemplary composite hybrid frame.

FIG. 4 illustrates an exemplary composite hybrid frame 403 according to aspects of the present disclosure. The frame 403 may be configured to minimize weight, as compared to traditional frames formed only from metal, such as steel. The frame 403 may be similar to the roof frame 103 (FIGS. 1A-1B) except as described below. The frame 403 may comprise one or more portions that are formed from a polymeric resin matrix 401 and/or continuous fiber composite laminate 404 (which may be similar to laminate 203 (FIG. 2)). The polymeric matrix 401 may be a unitary slab of polymeric resin. As an example, certain portions of the frame 403 may be formed from the laminate 404, with or without the polymeric resin matrix 301. As another example, certain portions of the frame 403 may be formed from the polymeric resin matrix 401, with or without the laminate 404. As a further example, certain portions of the frame 403 may be formed from a hybrid of the laminate 404 bonded with the polymeric resin matrix 401, such as via overmolding. The selection of the portions of the frame 403 that are formed from one or more of the laminate 404 and the polymeric resin matrix 401 may be based upon optimization techniques such as stress models and analysis for a particular vehicle that may incorporate the frame 403. The optimization techniques may seek to minimize the weight of the frame 403 and maximize the strength and stiffness of the frame 403. The selection of the portions of the frame 403 that are formed from one or more laminate 404 and the polymeric resin matrix 401 may be based upon cost analysis. It is understood that any number of parts and components may be selectively formed using one or more of the laminate 404 and polymeric resin matrix 401, as described herein.

As shown in FIG. 4, portions of the frame 403 may be formed of laminate 404. These portions may be regions of the frame 403 where static or dynamic loads are expected once the frame 403 is incorporated in a vehicle. These portions may require stiffness and strength that polymeric resin independently may not provide. As an example, stress analysis and/or modelling may be used to determine which components or surfaces of components may be exposed to stresses over a pre-determined threshold. Stress analysis and/or modeling may be performed using any numerical predictive engineering tools known in the art, such as Abaqus, NASTRAN, LS-Dyna, or Ansys. As such, certain components or surfaces may be formed from a hybrid composite to provide the needed support under stresses. Portions of the frame 403 that are formed of laminate 404 may also be formed from a polymeric resin matrix 401. The laminate 404 and the polymeric resin matrix 401 may be bonded. The polymeric resin matrix 401 may provide reinforcement and/or stability to laminate 404. Sections of the frame that do not comprise continuous fiber laminate 404 comprise polymeric resin. The selective placement of laminate 404 limits the weight of the frame 403 because continuous fiber composite is typically heavier than polymeric resin. Also, the selective placement of laminate 404 limits the cost of the frame because continuous fiber composite may be more expensive than polymeric resin, including the cost of the material and/or the cost of shaping the material. Also, portions of the frame 403 may be formed from the polymeric resin matrix 401 without laminate 404.

The frame 403 may comprise an omega crossbeam 407. The crossbeam 407 may be similar to crossbeam 107 (FIGS. 1A-1B) except as described below. FIG. 4C is a cross sectional view of the omega crossbeam 407 taken across line C-C. The crossbeam 407 may have an omega profile. An omega profile may have an upside down, capital letter omega shape. The crossbeam 407 may comprise a channel 440. The channel 440 may be defined by two walls 442 and 444 joined by a bottom surface 443. Walls 442 and 444 may have the same height or may have different heights. Walls 442 and 444 may each be coupled to a flange 441 or 445, respectively, where a flange 441, 445 extends from the top ledge of the wall 442 or 444, respectively, away from the bottom surface 443.

As an example, the walls 442, 444, bottom surface 443 and flanges 441, 445 may be formed of laminate 404. The laminate 404 may one or more strips. Referencing features in FIG. 4, when the frame 403 is incorporated in a vehicle, the crossbeam 407 may experience a compressive force directed from a longitudinal side portion 411 of the frame 403 towards a midsection 415 of the crossbeam 407. To further illustrate, if the frame 403 is incorporated in the vehicle and the vehicle experiences a roll-over crash, the crossbeam 407 must possess sufficient strength and stiffness to withstand compressive and tensile stress and also to provide support to the roof and passenger compartment of the vehicle. Therefore, for example, the crossbeam 407 may optimally be formed of laminate 404 to resist deformation as a result of the compressive and tensile forces. The frame 403 may comprise an aperture 405. As an additional example, the crossbeam 407 may hover over the aperture 405 of the frame 403. The crossbeam 407 may consequently experience a wind load once the frame 403 is incorporated in a vehicle. If the crossbeam 407 is formed of laminate 404, the crossbeam may be resilient to bending or breaking in response to a wind load.

As an additional example, the frame 403 may comprise a rear lateral end portion 412A and a front lateral end portion 412B. The rear lateral end portion 412A and front lateral end portion 412B may be similar to lateral end portion 112 (FIGS. 1A-1B) except as described below. The rear lateral end portion 412A may be closer to a rear of a vehicle in which the frame 403 is incorporated than front lateral end portion 412B. FIG. 4D is a cross-sectional view of the rear lateral end portion taken across line D-D. As shown, the rear lateral end portion 412A may comprise a channel 451. The channel 451 may be defined by walls 453 and 455 joined by a bottom surface 454. Walls 453 and 455 may each be coupled to a flange 452 or 456, respectively. The rear lateral end portion 412A may comprise a valley 450 between the flange 452 and the aperture 405 of the frame 403.

As an example of an expected load, the rear lateral end portion 412A may experience a compressive or tensile force from the rear of the vehicle or from an object disposed in the aperture 405. To provide another example, a component of a roof panel may be attached in the valley 450 or in the channel 451. The component of the roof panel could be, for example, an electric or mechanical cable assembly or a cassette for spooling a retractable screen. As an additional example, flange 452 could support a wind deflector. As a result, rear lateral end portion 412A may experience a static load. In anticipation of these loads, bottom surface 454 and flanges 452 and 456 may be composed of laminate 404. The laminate 404 may be strips. Also, bottom surface 454 and flanges 452 and 456 may be formed of laminate 404 over the polymeric resin matrix 401 in FIG. 4.

One or more of the walls 453, 455 may be formed of laminate to withstand shear load or bending load. Alternatively, one or more of the walls 453, 455 and may be formed of polymeric resin.

To further illustrate, when the frame 403 is incorporated in a vehicle, the rear lateral end portion 412A may rest on a surface of the vehicle. Hence, the rear lateral end portion 412A may be formed mostly of the polymeric resin matrix 401 without laminate 404 as the lateral end portion 412A would not have to be self-supporting like the omega crossbeam 407. For example, walls 453, 455 may be formed of polymeric resin and the polymeric matrix 401 in FIG. 4. The polymeric matrix 401 may further comprise the valley 450, such that the valley 450 and the walls 453, 455, flanges 452, 456, and bottom surface 454 of the rear lateral end portion 412A are one continuously molded piece of polymeric resin.

Referencing features depicted in FIG. 4, the frame 403 may comprise a front lateral end portion 412B. The front lateral end portion 412B may be closer to the front of a vehicle in which the frame 403 is incorporated than the rear lateral end portion 412A. FIG. 4B is a cross-sectional view of the front lateral end portion 412B, taken across line B-B. As shown, the front lateral end portion 412B may comprise a channel 430. The channel 430 may comprise two walls 431 and 433 joined by a bottom surface 432. The walls 431 and 433 may have different heights or the same height. As an example, the front lateral end portion 412B may experience a compressive force from the front of a vehicle or from an object disposed in the aperture 405 of the frame 403 once the frame 403 is incorporated in the vehicle. The front lateral end portion 412B may rest on a surface of the vehicle. The front lateral end portion 412B may not be attached to any components of the roof panel. As a result, the front lateral end portion 412B may be formed with less laminate 404 than the rear lateral end portion 412A. For example, walls 431 and 433 may be formed of the polymeric resin matrix 401 and the bottom surface 432 alone may be formed of laminate 404. The bottom surface 432 may be formed of a strip of laminate 404. The bottom surface 432 may be formed of laminate 404 embedded in the polymeric matrix 401.

The frame 403 may comprise a longitudinal side portion 411. The longitudinal side portion 411 may be similar to longitudinal side portion 111 (FIGS. 1A-1B) except as described below. FIG. 4E is a cross-sectional view of the longitudinal side portion 411 across line E-E. As shown in FIG. 4E, the longitudinal side portion 411 may comprise a channel 460. The channel 460 may comprise two walls 463 and 465 joined by a bottom surface 464. The walls 463 and 465 may have different heights or the same height. The walls 463 and 465 may be coupled to a flange 462 or 466, respectively, where a flange 462 or 466 extends from the top ledge of the wall 463 or 465, respectively, away from the bottom surface 464. The flanges 462 or 466 may be at different heights or the same height. The longitudinal side portion 411 may further comprise a drain channel 426 along an outer edge 467 of the longitudinal side portion 411, wherein the outer edge 467 lies on the opposite side of the channel 426 of the aperture 405, featured in FIG. 4. The drain channel 426 may have a U-shaped profile. The longitudinal side portion 411 may experience compressive or tensile load from an object disposed in the aperture 405 or from forces acting on a vehicle once the frame 403 is incorporated in the vehicle. The longitudinal side portion 411 may also experience a static load at the location 416, featured in FIG. 4, where the crossbeam 407 contacts the longitudinal side portion 411. Channel 460 may receive a component of the roof panel, such as a support structure for a cover member, like a bolt or a guide rail. Therefore, the longitudinal side portion 411 may require laminate 404 for strength and stiffness. For example, bottom surface 464 and flanges 462 and 466 may be formed of laminate 404. The laminate 404 in bottom surface 464 and flanges 462 and 466 may be strips. Bottom surface 464 and flanges 462 and 466 may be formed of laminate 404 and the polymeric resin matrix 301, where the laminate 404 is reinforced by the polymeric resin matrix 401. Walls 463 and 465 may be formed of the polymeric resin matrix 401. The drain channel 426 may be formed of the polymeric resin matrix 401.

FIG. 4A is a cross-sectional view of the longitudinal side portion 411 across line A-A. The longitudinal side portion 411 may comprise a channel 420 that runs at least from line E-E to line A-A. The channel 420 may connect to the channel 460 on longitudinal side portion 411 depicted in FIG. 4E. The channel 420 may comprise two walls 422 and 424 joined by a bottom surface 423. The walls 422 and 424 may have different heights or the same height. The walls 422 and 424 may be coupled to a flange, 421 or 425, respectively, where a flange 421 or 425 extends from the top ledge of a wall 422, 424, respectively, away from the bottom surface 423. The flanges 462 may be at different heights or the same height. The walls 422 and 424 in FIG. 4A may connect to the walls 463 and 465 in FIG. 4E on the longitudinal side portion 411. The bottom surface 423 in FIG. 4A may connect to the bottom surface 464 in FIG. 4E on the longitudinal side portion 411. The flanges 421 and 425 in FIG. 4A may connect to the flanges 462 and 466 in FIG. 4E on the longitudinal side portion 411. Depicted in FIGS. 4A and 4E, the longitudinal side portion 411 may further comprise a drain channel 426 along an outer edge 427 of the longitudinal side portion 411, wherein the outer edge 427 lies on the opposite side of the channel 426 of the aperture 405, featured in FIG. 4. The drain channel 426 may have a U-shaped profile. According to another aspect of the present disclosure, the frame 403 may comprise one or more portions formed from a laminate 404 of a defined laminate orientation. The laminate 404 may have, for example, a laminate orientation of $\pm0°$-$\pm10°$, $\pm11°$-$\pm20°$, $\pm21°$-$\pm30°$, $\pm31°$-$\pm40°$, $\pm41°$-$\pm50°$, $\pm51°$-$\pm60°$, $\pm61°$-$\pm70°$, $\pm71°$-$\pm80°$, $\pm81°$-$\pm90°$ or any combination or span thereof. The laminate 404 may have a symmetric laminate orientation, wherein the fibers above a mid-plane of the laminate 404 are a mirror image of the fibers below the mid-plane of the laminate 404. For example, a laminate with a symmetric orientation may comprise plies stacked such that the laminate orientation above the mid-plane is +45°, 0°, +60° and such that the laminate orientation above the mid-plane is +45°, 0°, +60°. The laminate 404 may have an unsymmetric laminate orientation. The laminate 404 may have a uniform laminate orientation, wherein each ply in the laminate 404 contacts another ply in the laminate 404 such that the fibers of the two plies cross at a specific angle. The laminate 404 may have a variable laminate orientation, wherein the plies of the laminate 404 are not stacked such that their fibers and the fibers of plies they contact cross at the same angle.

The strength and stiffness of a laminate 404 may depend, at least in part on the laminate orientation of the laminate 404. For example, a laminate with a laminate orientation of $\pm0$-$45°$ may have greater shear stiffness than a laminate with a laminate orientation of $\pm46$-$90°$. A laminate with a laminate orientation of $\pm46$-$90°$ may have greater bending stiffness than a laminate with a laminate orientation of $\pm0$-$45°$. The selection of the portions of the frame 403 that are formed of a laminate 404 with a specific laminate orientation may be based upon optimization techniques, such as stress models and analysis for a particular vehicle that may incorporate the frame 403.

For example, referring to features depicted in FIG. 4, the frame 403 may comprise front corners 413 and rear corners 414 where the longitudinal side portions and the lateral end portions meet. The front corners 413 may be closer to the front of a vehicle in which the frame 403 is incorporated than the rear corners 414. The rear corners 414 may be closer to the rear of a vehicle in which the frame 403 is incorporated than the rear corners 413. When the frame 403 is incorporated in the vehicle, the frame 403 may be secured to the body of the vehicle at the front corners 413 and the rear corners 414. After the frame is secured, a front corner 113 may experience a shear load from the direction of the longitudinal side portion 411 and the front lateral end portion 412B that meet at front corner 413. Consequently, the front corner 413 could be formed of laminate with a ±0°-±45° laminate orientation. According to an aspect of the present disclosure, a portion of the frame 403 that is formed of laminate 404, where the laminate 404 is a strip may be formed of unidirectional laminate. According to another aspect of the present disclosure, portions of the frame 403 that are formed of laminate 404 that has been shaped, for example into an omega structure, may be formed of multidirectional laminate. According to yet another aspect of the present disclosure, portions of the frame 403 where bolting will occur may be formed of multidirectional laminate. According to an additional aspect of the present disclosure, unidirectional laminate forms a portion of the frame 403 such that the fibers are oriented along critical load paths.

According to an aspect of the present disclosure, the frame 403 may comprise one or more portions formed from a laminate 404 that has a specific fiber content. For example, a laminate may have a fiber content of 30-70% by volume. Also, the frame 403 may comprise one or more portions formed form a laminate 404 that has a specific thickness. For example, a laminate may have a thickness in the range of 0.5 mm to 4 mm. The selection of portions of the frame 403 that are formed of a laminate 404 with a specific fiber volume or laminate thickness may be based upon optimization techniques, such as stress models and analysis for a particular vehicle that may incorporate the frame 403.

According to another aspect of the present disclosure, a frame 403 may be configured to minimize weight and maximize stiffness by comprising one or more ribs 417. A rib 417 may be formed of polymeric resin. A rib 417 may be formed of a polymeric resin that is unfilled or filled, such as with a short fiber or a long fiber. A rib 417 may be injection molded or compression molded. A rib 417 may be disposed on a longitudinal side portion 411 or a lateral end portion 412. For example, a rib 417 may be disposed in channel 420 of the longitudinal side portion 411 featured in FIG. 4A. A rib 417 may be disposed in channel 430 of lateral end portion 412B featured in FIG. 4B. The rib 417 may comprise a portion of the polymeric resin matrix 401. A rib 417 may be attached to the frame 403 after the frame 403 is formed. The rib 417 may be disposed on top of laminate 404. For example, referencing FIG. 4B, a rib 417 may lie on a strip of laminate 404 that forms the bottom surface 432 of the channel 430. Rather, at least a portion of a rib 417 may rest on a flange of a longitudinal side portion 411 or lateral end portion 412, such as on the flanges 452 and 456 in FIG. 4D or on the flanges 462 and 466 in FIG. 4E.

The frame 403 may comprise a plurality of ribs 417. The plurality of ribs 417 may be arranged in any of a variety of configurations. For example, the plurality of ribs 417 may be arranged in a parallel configuration, like the plurality of ribs 417 at line A-A of the longitudinal side portion 411 or at line B-B of the front lateral end portion 412B in FIG. 4. For example, the plurality of ribs may be arranged in a sawtooth or lattice configuration, like the plurality of ribs 417 at line D-D of the lateral end portion 412A in FIG. 4. According to an aspect of the disclosure, the plurality of ribs 417 may be arranged in a parallel configuration in portions of the frame 403 where movable a component of a roof panel may be disposed, like a sliding cover member on guide rails. The plurality of ribs 417 in a parallel configuration may facilitate movement of the movable components, for example. The plurality of ribs 417 may be arranged in a sawtooth or lattice configuration in portions of the frame 403 where a fixed component or portion of the roof panel may be disposed, like a hatch or a latch. To further illustrate, channels 420 in FIG. 4A and 460 in FIG. 4E on longitudinal side portion 411 may connect to form portions of the same channel, however a plurality of ribs 417 in a sawtooth configuration may be disposed in channel 460 to accommodate a fixed component or portion of a roof panel. A plurality of ribs 417 in a parallel configuration may be disposed in channel 420 to accommodate a movable component or portion of a roof panel.

It should be noted that the configuration of the frame may be determined, at least in part, by the type of vehicle in which the frame will be incorporated. Also, the configuration of the frame may be determined, at least in part, by the type of roof panel that the frame will support.

Despite weighing less than traditional metal frames, composite hybrid frames have been found to perform mechanically as well as traditional frames, such as frames made only of metal (e.g. steel). Table 1 and Table 2 present experimental data from three simulations using predictive engineering tools for computerized structural analysis. The first simulation measured the weights of a composite hybrid frame manufactured using a one-shot overmolding process, a composite hybrid frame manufactured using a two-shot overmolding process, and a steel frame. As evidenced by the test data in the first and second columns of Table 1, the composite hybrid frames weighed 29% and 37% less than the steel frame.

The second simulation measured the corner stiffness of the frames. The program simulated securing three of the four corners of each frame and subjecting the fourth corner to a force, specifically a bending load, with a known magnitude measured in Newtons (N). The simulated deformation of the fourth corners resulting from the applied force of the frames was calculated and measured in millimeters (mm). The corner stiffness, recorded in the third and fourth columns of Table 1, was calculated as the applied force over the fourth corner deformation. Corner stiffness was measured on two corners on each frame. The corner stiffness of the composite hybrid frames and the steel frame was 0.21 N/mm for a first corner and 0.24 N/mm for a second corner, supporting a finding that the composite hybrid frames were as strong as the steel frame.

TABLE 1

| | Mass | | Corner Stiffness (N/mm) | |
| --- | --- | --- | --- | --- |
| | Total (kg) | Weight Saving (%) | Corner 1 (kz1) | Corner 2 (kz2) |
| Steel Frame | 7.38 | N/A | 0.21 | 0.24 |
| One-Shot Frame | 5.26 | 29 | 0.21 | 0.24 |
| Two-Shot Frame | 4.77 | 37 | 0.21 | 0.24 |

The third simulation measured the ability of the frames to resist wind load deflection. The simulation modeled a constant wind load applied to the frames, where the apertures of the frames were installed with glass panes. The deflection of the frames was calculated and measured in millimeters (mm). The deflection of the frames was calculated with the glass panes simulated in an open configuration and in a closed configuration. The deflection of the frames was calculated at the front of the frames and the rear of the frames, where the front is the half of the frame closest to the front of a vehicle in which the frame is implemented and the rear is the half of frame closest to the rear of a vehicle in which the frame is implemented. As reflected in the measurements in the Table 2, the deflection of the composite hybrid frames and the steel frame were determined to be the same. The wind load deflection of the composite hybrid frames as compared to the wind load deflection of the steel frame offers further evidence that the composite hybrid frames are as strong as steel frames.

TABLE 2

|  | Wind Load Deflection (mm) | | | |
| --- | --- | --- | --- | --- |
|  | Open | | Closed | |
|  | Front | Rear | Front | Rear |
| Steel Frame | 2.6 | 0.4 | 5.8 | 4.4 |
| One-Shot Frame | 2.6 | 0.4 | 5.8 | 4.4 |
| Two-Shot Frame | 2.6 | 0.4 | 5.8 | 4.4 |

Further simulations have been performed to predict resistance to deformation in response to side and roof crush loads. The hybrid composite frames of the present disclosure were determined to exhibit the same or superior deformation characteristics as compared to a substantially similar frame consisting essentially of the same components but formed from steel.

According to an aspect of the present disclosure, a composite hybrid frame offers additional structural advantages over a traditional roof frame. For example, a composite hybrid frame may be more resistant to corrosion than a traditional frame, such as a frame formed only of metal. Also, a composite hybrid frame may be more resistant to fatigue than a traditional frame, such as a frame formed only of metal. Also, a composite hybrid frame may occupy less space than a traditional frame formed only of metal without suffering from any mechanical deficiencies. Additionally, a composite hybrid frame may cost less to manufacture than a traditional frame formed only of metal. The process of assembling a frame may be simplified by a composite hybrid frame as a lighter frame allows for greater ease of handling than with a traditional frame made only of metal. Further, a composite hybrid frame offers more design options than a traditional metal frame. For example, a composite hybrid frame can be designed to integrally comprise additional components of a roof panel or a vehicle. Also, composite hybrid frames may be easier to recycle than traditional metal frames.

According to an aspect of the present disclosure, a composite hybrid frame may be manufactured with an overmolding process. The overmolding process may use an injection molding machine and/or injection molding techniques. However other molding machines and techniques may be used, including but not limited to compression molding or injection-compression molding. The overmolding process may be a one-shot overmolding process or a two-shot overmolding process. The following explanations of the one-shot and two-shot overmolding processes include a simplified description of an injection molding technique. However, injection molding techniques are well-known to those skilled in the art of fabrication.

The one-shot overmolding process may comprise the following steps. Continuous fiber composite laminate may be inserted in a cavity, such as a mold cavity, of an injection molding machine. The laminate may comprise one or more strips. A laminate securing mechanism may be disposed in the cavity, such as a tool to hold the laminate in a fixed position, like one or more pins, needles, or retractable tools. The contours of the cavity may conform to the shape of at least a portion of the frame. A shaping system may be disposed in the cavity that is operable to shape a laminate to form a crossbeam. The shaping system may be operable to shape the laminate to form an omega crossbeam, wherein the omega crossbeam has an omega-shaped profile. The shaping system may be a tool that shapes the laminate by applying pressure, such as a press brake or a set of plates. The set of plates may be die plates. The set of plates may be operable to join in a closed position. The set of plates may shape the laminate by applying pressure when going from an open position to a closed position. The shaping system may comprise the cavity. The cavity may be a mold cavity, such as a hollow area between the set of plates in a closed position.

After the crossbeam has been formed, the polymeric resin may enter the injection molding machine. The polymeric resin may be fed into a barrel where it may be heated above the softening point of the base thermoplastic in the polymeric resin. The heated polymeric resin may be forced into the cavity of the injection molding machine. The heated polymeric resin may fill the empty space in the cavity. The empty space in the cavity may be any area of the cavity that is not occupied by the laminate. The heated polymeric resin may fill the empty space in the cavity over the laminate. As the polymeric resin cools, it may harden to the contours of the cavity to form the polymeric resin matrix. As the polymeric resin cools, if it is disposed over laminate or is in contact with laminate in the cavity, it may bond to the laminate. After the polymeric resin cools, the polymeric resin and the laminate in the cavity may comprise a closed frame, wherein the closed frame comprises a crossbeam. The closed frame may be removed from the cavity.

According to an aspect of the present disclosure, the laminate may be heated before the polymeric resin enters the cavity to improve bonding between the laminate and the polymeric resin.

The two-shot overmolding process may comprise the following steps. A crossbeam may be formed independently of other portions of a frame. The crossbeam may be formed from laminate. The crossbeam may be shaped by any appropriate shaping technique, including pressing or thermoforming. An open frame without a crossbeam may be formed independently of the crossbeam by following steps. Continuous fiber composite laminate may be inserted in a cavity, such as a mold cavity, of an injection molding machine. The laminate may comprise one or more strips. The contours of the cavity may conform to the shape of at least a portion of the frame. The polymeric resin may enter the injection molding machine. The polymeric resin may be fed into a barrel where it may be heated above the softening point of the base thermoplastic in the polymeric resin. The heated polymeric resin may be forced into the cavity of the injection molding machine. The heated polymeric resin may fill the empty space in the cavity. The empty space in the cavity may be any area of the cavity that is not occupied by the laminate. The heated polymeric resin may fill the empty space in the cavity over the laminate. As the polymeric resin cools, it may harden to the contours of the cavity to form the polymeric resin matrix. As the polymeric resin cools, if it is disposed over laminate or is in contact with laminate in the cavity, it may bond to the laminate. After the polymeric resin cools, the polymeric resin and the laminate in the cavity may comprise an open frame without a crossbeam. The open frame may be removed from the cavity. After the crossbeam is independently formed and the open frame is formed, the crossbeam can be attached to the open frame by any appropriate means, including gluing or welding, to form a frame.

According to an aspect of the present disclosure, the laminate may be heated before the polymeric resin enters the cavity to improve bonding between the laminate and the polymeric resin.

According to one aspect of the present disclosure, a composite hybrid frame comprises one or more drain channels. The polymeric resin matrix may comprise one or more drain channels. The drain channel may run axially along a longitudinal side portion. The drain channel may comprise a semi-elliptical groove. The drain channel may be operable to route water to one or more exit points on the frame where the water may run off the frame. The drain channel may be operable to route water to one or more exit points on the frame so that water does not collect on the frame. The frame may further comprise a crossbeam that runs perpendicular to the drain channel. The crossbeam may be an omega crossbeam with an omega-shaped profile, a U-shaped profile, or a hat-shaped profile. The crossbeam may comprise a channel that is operable to egress water. The channel may be operable to route water to the drain channel or to an exit point on the frame.

According to an aspect of the present disclosure, the configuration of the crossbeam with respect to the drain channel may differ depending, at least in part, whether the frame is formed with the one-shot overmolding process or the two-shot overmolding process. FIG. 5A illustrates the intermediary products of a two-shot overmolding process to manufacture a frame. FIG. 5A includes an open frame 503 and an independently-formed crossbeam 507 which may be attached to form a frame. The open frame 503 may be a portion of roof frame 103 in FIGS. 1A and 1B. The independently-formed crossbeam 507 may be like the crossbeam 107 in FIGS. 1A and 1B. The open frame 503 may comprise one or more points of contact 502 on a longitudinal side portion 511 where one or more corresponding points 506 on an independently-formed crossbeam 507 may be attached to the open frame 503. As illustrated in FIGS. 5A-5B, the one or more points of contact 502 may be arranged on either side of a drain channel 501. The one or more points of contact 502 may comprise a portion of a polymeric resin matrix.

FIG. 5C is a close-up view of a portion of a longitudinal side portion 511 of an open frame 503 and a crossbeam 507 where the crossbeam 507 is attached to the open frame 503 to form a roof frame. The one or more points of contact 502 may be distributed on the longitudinal side portion 511 such that a portion of the crossbeam 507 may bridge a portion of the drain channel 501 when the one or more corresponding points 506 of the crossbeam 507 are attached to the one or more points of contact 502 on the open frame 503.

FIG. 5D is a cross-sectional view across line A-A the longitudinal side portion 511 in FIG. 5C where the crossbeam 507 bridges the drain channel 501 when the one or more corresponding points 506 of the crossbeam 507 are attached to the one or more points of contact 502 on the open frame 503. As illustrated in FIG. 5D, a portion of the crossbeam 507 may bridge a portion of the drain channel 501 without obstructing a portion of the drain channel 501.

It should be appreciated that using current overmolding technology, the one-shot overmolding process may not be used to form a closed frame comprising a crossbeam and a drain channel wherein a portion of the crossbeam bridges a portion of the drain channel without obstructing a portion of the drain channel. With current overmolding technology, to allow for removal of a molded part from a cavity of an injection molding machine, a feature of the molded part must not overhang another feature of the molded part in the direction in which the cavity opens. Traditionally, the cavity of an injection molding machine is a mold cavity between two plates. A cavity may open in a vertical direction where a first plate is displaced from a second plate in a vertical direction. Alternatively, a cavity may open in a horizontal direction where a first plate is displaced from a second plate in a horizontal direction. Therefore, using current injection molding techniques, it may not be feasible to form a composite hybrid frame that comprises a feature formed of polymeric resin that looms directly above or below another feature of the frame in the direction in which the a cavity opens. In other words, a composite hybrid frame formed by current injection molding techniques may not comprise two features with empty space between the features in the direction in which the cavity opens if at least one of the features is formed of polymeric resin.

Applying this technical constraint to the present disclosure, a closed frame formed by the one-shot overmolding process may not be formed such that a portion of the crossbeam bridges a portion of the drain channel formed in the polymeric resin matrix without obstructing a portion of the drain channel. To do so may require an empty space to exist directly between a portion of the crossbeam and a portion of the drain channel. An open frame manufactured using the two-shot overmolding process may evade this technical constraint as a crossbeam is attached to an open frame after the open frame has been formed. Using the two-shot overmolding process, a portion of the crossbeam may loom above a portion of the drain channel formed in the polymeric resin matrix.

Figure 6A:
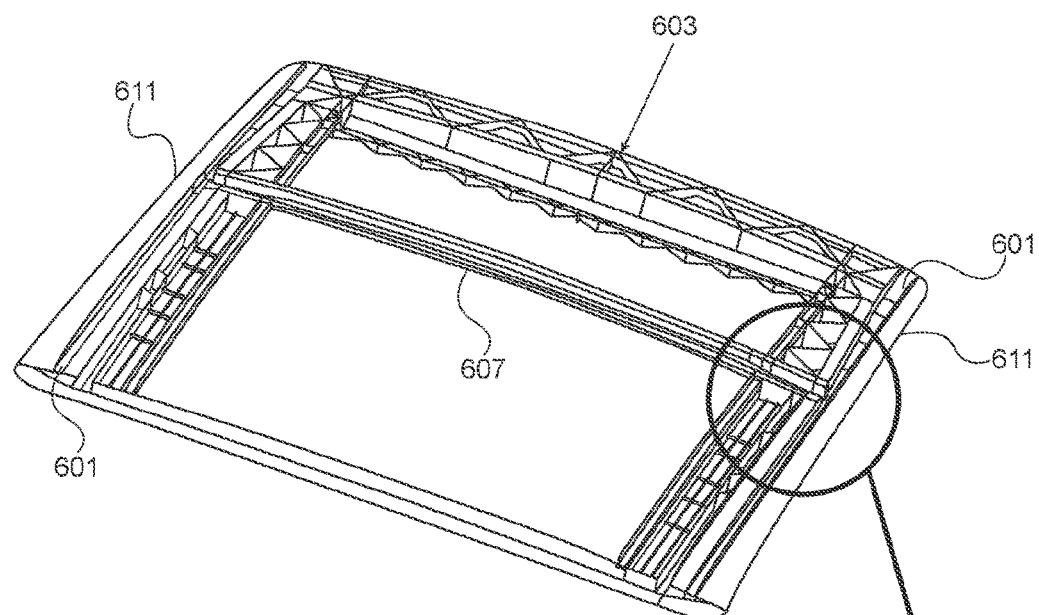
FIG. 6A illustrates an exemplary closed composite hybrid frame formed with the one-shot overmolding process.
Figure 6B:
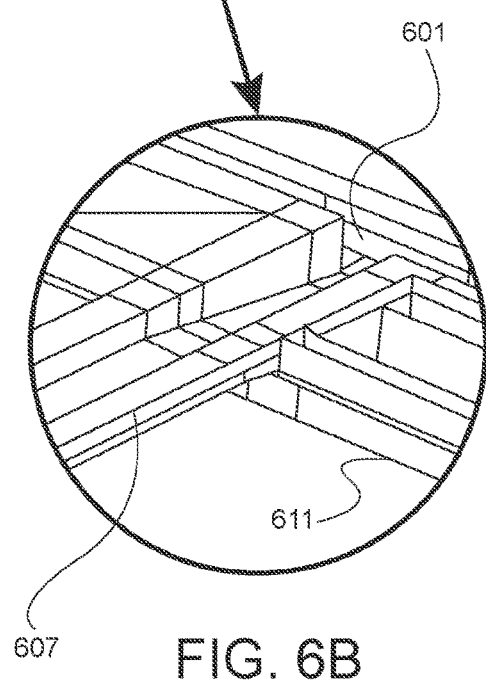
FIG. 6B is an enlarged view of a region of the exemplary closed frame in FIG. 6A.

FIG. 6A illustrates a closed frame 603, such as a closed frame manufactured with the one-shot overmolding process. The closed frame 603 may be similar to the roof frame 103 (FIGS. 1A-1B), except as described below. The closed frame 603 may comprise a drain channel 601 on a longitudinal side portion 611. As illustrated in FIG. 6A, a portion of the crossbeam 607 may transverse a portion of a longitudinal side portion 611. However, a portion of the crossbeam 607 may not extend across or in to a portion of the drain channel 601.

It should be appreciated that the aforementioned technical constraints are simply a reflection on the current state of overmolding technology and injection molding technology and should not be construed as limitations of the present disclosure.

A composite hybrid frame may be designed so that its structure is operable to receive other components of a roof panel or systems to operate a roof panel. For example, a frame may include a pocket to receive metal guide rails for a sliding part. A frame may include a pocket to receive cable routing. Additional components of a roof panel or systems to operate a roof panel may be affixed to a hybrid composite frame by any appropriate means, such as welding, gluing, or with mechanical joining techniques. A hybrid composite frame could be overmolded to integrally comprise other components or systems to operate a roof panel of a roof panel, like a cassette for spooling a retractable panel.

LIST OF EXAMPLES

A non-exhaustive list of examples of the roof frames described above is provided below, in addition to examples of the processes to make the frames described above.

Example 1: A roof frame configured to support a roof panel, the roof frame comprising, consisting of, or consisting essentially of: a pair of longitudinal side portions, each of the longitudinal side portions comprising a first structure disposed on opposite sides of an aperture, the aperture configured to receive at least a portion of the roof panel; a first lateral end portion configured to be coupled between each of the longitudinal side portions, the first lateral end portion comprising a second structure disposed adjacent the aperture at a first end of the longitudinal side portions; a second lateral end portion configured to be coupled between each of the longitudinal side portions, the second lateral end portion comprising a third structure disposed adjacent the aperture at a second end of the longitudinal side portions, opposite the first end; and a crossbeam comprising a fourth structure, the crossbeam disposed between the first lateral end portion and the second lateral end portion and configured to extend between the longitudinal side portions across at least a portion of the aperture, wherein at least one of the first, second, third, and fourth structures comprises a first surface formed from a first continuous fiber composite comprising a multidirectional laminate, wherein at least one of the first, second, third, and fourth structures comprises a second surface formed from a second continuous fiber composite comprising a unidirectional laminate, wherein the first surface and the second surface are selected to be formed from the first continuous fiber composite and the second continuous fiber composite, respectively, based at least upon a stress analysis for the respective surface, wherein the first surface exhibits a higher stress profile as compared to the second surface.

Example 2: The roof frame of example 1, wherein the crossbeam comprises the first surface.

Example 3: The roof frame of example 2, wherein the multidirectional laminate has a ±45° laminate orientation.

Example 4: The roof frame of any one of examples 1-3, wherein at least one of the first, second, third, and fourth structures comprises a third surface formed from a polymeric resin, wherein the third surface is selected to be formed from the polymeric resin based at least upon a stress analysis for the respective surface, wherein the first surface exhibits a higher stress profile as compared to the third surface.

Example 5: The roof frame of example 4, wherein at least a portion of the third surface is injection molded.

Example 6: The roof frame of any one of examples 1-4, wherein the roof frame is overmolded using a one-step overmolding process comprising: disposing a plurality of pieces of the continuous fiber composite in an injection molding machine; and overmolding the plurality of pieces of the continuous fiber composite with the polymeric resin to couple the plurality of pieces in the injection molding machine, wherein at least one of the plurality of pieces comprises the crossbeam.

Example 7: The roof frame of any one of examples 1-4, wherein the roof frame is overmolded using a two-step overmolding process comprising: forming the pair of longitudinal side portions, the first lateral end portion, and the second lateral end portion by: disposing a plurality of pieces of the continuous fiber composite in an injection molding machine; and overmolding the plurality of pieces of the continuous fiber composite with the polymeric resin to couple the plurality of pieces in the injection molding machine; independently forming the crossbeam; and attaching the crossbeam to the pair of longitudinal side portions.

Example 8: The roof frame of example 7, wherein the crossbeam is formed with a press.

Example 9: The roof frame of example 7, wherein the crossbeam is formed with thermoforming.

Example 10: The roof frame of any one of examples 1-3, wherein at least one of the first, second, third, and fourth structures comprises a third surface formed from a continuous fiber composite and a polymeric resin.

Example 11: The roof frame of any one of examples 1-10, wherein the polymeric resin is a filled thermoplastic.

Example 12: The roof frame of any one of examples 1-10, wherein the polymeric resin is an unfilled thermoplastic.

Example 13: The roof frame of any one of examples 1-10, wherein the continuous fiber composite comprises carbon fibers.

Example 14: The roof frame of any one of examples 1-10, wherein the continuous fiber composite comprises glass fibers.

Example 15: The roof frame of any one of examples 1-10, wherein the continuous fiber composite comprises: a plurality of fibers and a matrix, the matrix formed from a first thermoplastic, wherein the plurality of fibers are embedded in the matrix, and wherein the polymeric resin is formed from a second thermoplastic.

Example 16: The roof frame of example 15, wherein the first thermoplastic is a polyamide Example 17: The roof frame of example 15, wherein the first thermoplastic is a polycarbonate.

Example 18: The roof frame of example 15, wherein the second thermoplastic is polypropylene.

Example 19: The roof frame of example 15, wherein the first thermoplastic and the second thermoplastic are the same.

Example 20: The roof frame of any one of examples 1-19, wherein the first or second continuous fiber composite is 30-70% fiber by volume.

Example 21: The roof frame of any one of examples 1-20, wherein the polymeric resin is 10-70% fiber by weight.

Example 22: The roof frame of any one of examples 1-21, wherein the first lateral end portion further comprises a pocket operable to receive a cassette; wherein the at least a portion of the roof panel comprises a cover member; and wherein the cassette is operable to spool the cover member.

Example 23: The roof frame of any one of examples 1-22, wherein the longitudinal side portions further comprise a receptacle operable to receive a guide rail.

Example 24: The roof frame of any one of examples 1-23, wherein the roof panel is a sun roof panel.

Example 25: The roof frame of any one of examples 1-23, wherein the roof panel is a moon roof panel.

Example 26: The roof frame of any one of examples 1-23, wherein the roof panel is a hatch.

Example 27: The roof frame of any one of examples 1-26, wherein the at least a portion of the roof panel comprises a cover member.

Example 28: The roof frame of example 27, wherein the cover member comprises a metal sheet.

Example 29: The roof frame of example 27, wherein the cover member comprises a glass pane.

Example 30: The roof frame of example 27, wherein the cover member comprises a fabric sheet.

Example 31: The roof frame of any one of examples 1-30, wherein the at least a portion of the roof panel comprises a guide rail.

Example 32: The roof frame of any one of examples 1-31, wherein the first lateral end portion comprises a channel, the channel comprising two walls joined by a bottom surface.

Example 33: The roof frame of example 32, wherein the two walls are formed from a polymeric resin.

Example 34: The roof frame of example 32, wherein the second surface comprises one of the two walls.

Example 35: The roof frame of any one of Examples 1-34, wherein the crossbeam comprises a channel, the channel comprising two walls joined by a bottom surface.

Example 36: The roof frame of example 35, wherein the bottom surface is formed from the continuous fiber composite.

Example 37: The roof frame of example 35, wherein the first surface comprises the bottom surface of the crossbeam.

Example 38: The roof frame of any one of examples 1-37, wherein the continuous fiber composite comprises a laminate.

Example 39: The roof frame of any one of examples 1-38, wherein the continuous fiber composite comprises a laminate strip.

Example 40: The roof frame of any one of examples 1-39 further comprising a polymeric resin rib.

Example 41: The roof frame of any one of examples 1-40, wherein the second surface is bonded to the first surface.

Example 42: The roof frame of example 4, wherein the third surface is overmolded on the first surface.

Example 43: The roof frame of any one of examples 1-42, wherein the first surface is in contact with the second surface.

Example 44: The roof frame of any one of examples 1-43, wherein the longitudinal side portions further comprise a drain channel.

Example 45: The roof frame of example 44, wherein the crossbeam bridges the drain channel.

Example 46: The roof frame of any one of examples 1-45, wherein the crossbeam has an omega-shaped profile.

Example 47: A roof frame configured to support a roof panel, the roof frame comprising, consisting of, or consisting essentially of: a pair of longitudinal side portions, each of the longitudinal side portions comprising a first support structure disposed on opposite sides of an aperture, the aperture configured to receive at least a portion of the roof panel; a first lateral end portion configured to be coupled between each of the longitudinal side portions, the first lateral end portion comprising a second support structure disposed adjacent the aperture at a first end of the longitudinal side portions; a second lateral end portion configured to be coupled between each of the longitudinal side portions, the second lateral end portion comprising a third support structure disposed adjacent the aperture at a second end of the longitudinal side portions, opposite the first end; and a crossbeam comprising a fourth support structure, the crossbeam disposed between the first lateral end portion and the second lateral end portion and configured to extend between the longitudinal side portions across at least a portion of the aperture, wherein at least one of the first, second, third, and fourth support structures comprises a first surface formed from a continuous fiber composite, wherein at least one of the first, second, third, and fourth support structures comprises a second surface formed from a polymeric resin without continuous fiber reinforcement, wherein the first surface and the second surface are selected to be formed from the continuous fiber composite and the polymeric resin without continuous fiber reinforcement, respectively, based at least upon a stress analysis for the respective surface, wherein the first surface exhibits a higher stress profile as compared to the second surface.

Example 48: The roof frame of example 47, wherein at least a portion of the second surface is injection molded.

Example 49: The roof frame of example 47, wherein the roof frame is overmolded using a one-step overmolding process comprising: disposing a plurality of pieces of the continuous fiber composite in an injection molding machine; and overmolding the plurality of pieces of the continuous fiber composite with the polymeric resin to couple the plurality of pieces in the injection molding machine, wherein at least one of the plurality of pieces comprises the crossbeam.

Example 50: The roof frame of example 47, wherein the roof frame is overmolded using a two-step overmolding process comprising: forming the pair of longitudinal side portions, the first lateral end portion, and the second lateral end portion by: disposing a plurality of pieces of the continuous fiber composite in an injection molding machine; and overmolding the plurality of pieces of the continuous fiber composite with the polymeric resin to couple the plurality of pieces in the injection molding machine; independently forming the crossbeam; and attaching the crossbeam to the pair of longitudinal side portions.

Example 51: The roof frame of example 50, wherein the crossbeam is formed with a press.

Example 52: The roof frame of example 50, wherein the crossbeam is formed with thermoforming.

Example 53: The roof frame of example 47, wherein at least one of the first, second, third, and fourth support structures comprises a third surface formed from a continuous fiber composite and the polymeric resin.

Example 54: The roof frame of any one of examples 47-53, wherein the polymeric resin is a filled thermoplastic.

Example 55: The roof frame of any one of examples 47-53, wherein the polymeric resin is an unfilled thermoplastic.

Example 56: The roof frame of any one of examples 47-53, wherein the continuous fiber composite comprises carbon fibers.

Example 57: The roof frame of any one of examples 47-53, wherein the continuous fiber composite comprises glass fibers.

Example 58: The roof frame of any one of examples 47-53, wherein the continuous fiber composite comprises a plurality of fibers and a matrix, the matrix formed from a first thermoplastic, wherein the plurality of fibers are embedded in the matrix, and wherein the polymeric resin is formed from a second thermoplastic.

Example 59: The roof frame of example 58, wherein the first thermoplastic is a nylon.

Example 60: The roof frame of example 58, wherein the first thermoplastic is a polycarbonate.

Example 61: The roof frame of example 58, wherein the second thermoplastic is polypropylene.

Example 62: The roof frame of example 58, wherein the first thermoplastic and the second thermoplastic are the same.

Example 63: The roof frame of any one of examples 47-62, wherein the continuous fiber composite comprises unidirectional laminate.

Example 64: The roof frame of any one of examples 47-62, wherein the continuous fiber composite comprises multidirectional laminate.

Example 65: The roof frame of any one of examples 47-64, wherein the continuous fiber composite is 30-70% fiber by volume.

Example 66: The roof frame of any one of examples 47-65, wherein the polymeric resin is 10-70% fiber by weight.

Example 67: The roof frame of any one of examples 47-66, wherein the first lateral end portion further comprises a pocket operable to receive a cassette; wherein the at least a portion of the roof panel comprises a cover member; and wherein the cassette is operable to spool the cover member.

Example 68: The roof frame of any one of examples 47-67, wherein the longitudinal side portions further comprise a receptacle operable to receive a guide rail.

Example 69: The roof frame of any one of examples 47-68, wherein the roof panel is a sun roof panel.

Example 70: The roof frame of any one of examples 47-68, wherein the roof panel is a moon roof panel.

Example 71: The roof frame of any one of examples 47-68, wherein the roof panel is a hatch.

Example 72: The roof frame of any one of examples 47-71, wherein the at least a portion of the roof panel comprises a cover member.

Example 73: The roof frame of example 72, wherein the cover member comprises a metal sheet.

Example 74: The roof frame of example 72, wherein the cover member comprises a glass pane.

Example 75: The roof frame of example 72, wherein the cover member comprises a fabric sheet.

Example 76: The roof frame of any one of examples 47-75, wherein the at least a portion of the roof panel comprises a guide rail.

Example 77: The roof frame of any one of examples 47-76, wherein the first lateral end portion comprises a channel, the channel comprising two walls joined by a bottom surface.

Example 78: The roof frame of example 77, wherein the two walls are formed from the polymeric resin.

Example 79: The roof frame of example 77, wherein the second surface comprises one of the two walls.

Example 80: The roof frame of any one of examples 47-79, wherein the crossbeam comprises a channel, the channel comprising two walls joined by a bottom surface.

Example 81: The roof frame of example 80, wherein the bottom surface is formed from the continuous fiber composite.

Example 82: The roof frame of example 80, wherein the first surface comprises the bottom surface of the crossbeam.

Example 83: The roof frame of any one of examples 47-82, wherein the continuous fiber composite comprises a laminate.

Example 84: The roof frame of any one of examples 47-83, wherein the continuous fiber composite comprises a laminate strip.

Example 85: The roof frame of any one of examples 47-84, wherein the polymeric resin further comprises a rib.

Example 86: The roof frame of any one of examples 47-85, wherein the second surface is bonded to the first surface.

Example 87: The roof frame of any one of examples 47-86, wherein the second surface is overmolded on the first surface.

Example 88: The roof frame of any one of examples 47-87, wherein the first surface is in contact with the second surface.

Example 89: The roof frame of any one of examples 47-88, wherein the longitudinal side portions further comprise a drain channel.

Example 90: The roof frame of example 89, wherein the crossbeam bridges the drain channel.

Example 91: The roof frame of any one of examples 47-90, wherein the crossbeam has an omega-shaped profile.

Example 92: A method of making the roof panel of any one of examples 1-91, the method comprising, consisting of, or consisting essentially of: determining a stress profile of one or more surfaces of the roof panel; and selecting a process to form the one or more surfaces based at least on the determined stress profile.

Example 93: The roof frame of any one of examples 1-91, wherein the crossbeam comprises a channel.

Example 94: The roof frame of any one of examples 1-91, 93, wherein the roof panel has a sliding member.

Example 95: The roof frame of any one of examples 1-91, 93, wherein the roof panel has at least a first member and a second member.

Example 96: The roof frame of example 95, wherein the first member is a sliding member and the second member is a fixed member.

Example 97: The roof frame of any one of examples 1-96, wherein the multidirectional laminate has a ±0°-±90° laminate orientation.

Example 98: The roof frame of any one of examples 1-46, 63, wherein the multidirectional laminate has a ±0°-±45° laminate orientation.

Example 99: The roof frame of any one of examples 1-96, 63, wherein the multidirectional laminate has a ±45°-±90° laminate orientation.

Example 100: The roof frame of any one of examples 1-96, 63, wherein the multidirectional laminate has a ±0°, ±30°, ±60°, ±90° laminate orientation.

Example 101: The roof frame of any one of examples 1-96, 63, wherein the multidirectional laminate has a ±0°, ±45°, ±60°, ±90° laminate orientation.

Example 102: The roof frame of any one of examples 1-96, 63, wherein the multidirectional laminate has a uniform laminate orientation.

Example 103: The roof frame of any one of examples 1-96, 63, wherein the multidirectional laminate has a variable laminate orientation.

Example 104: The roof frame of any one of examples 1-96, 63, wherein the multidirectional laminate has a symmetric laminate orientation.

Example 105: The roof frame of any one of examples 1-96, 63, wherein the multidirectional laminate has an unsymmetric laminate orientation.

Example 106: The roof frame of example 47, 63, wherein the continuous fiber composite comprises a hybrid laminate.

Example 107: The roof frame of example 47, 63, wherein the continuous fiber composite comprises a laminate that one or more plies that comprise the same materials.

Example 108: The roof frame of example 1, wherein at least one of the first continuous fiber composite or the second continuous fiber composite comprises a hybrid laminate.

Example 109: The roof frame of example 1, wherein at least one of the continuous fiber composite comprises a laminate that one or more plies that comprise the same materials.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific aspects in which the disclosure may be practiced. These aspects are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects may be combined with each other in various combinations or permutations. The scope of the disclosure should be determined with reference to the appended claims, along with the full scope of equivalents to which such claims are entitled.

What is claimed is:

1. A roof frame configured to support a roof panel, the roof frame comprising:
    a pair of longitudinal side portions, each of the longitudinal side portions comprising a first structure disposed on opposite sides of an aperture, the aperture configured to receive at least a portion of the roof panel;
    a first lateral end portion configured to be coupled between each of the longitudinal side portions, the first lateral end portion comprising a second structure disposed adjacent the aperture at a first end of the longitudinal side portions;
    a second lateral end portion configured to be coupled between each of the longitudinal side portions, the second lateral end portion comprising a third structure disposed adjacent the aperture at a second end of the longitudinal side portions, opposite the first end; and
    a crossbeam comprising a fourth structure, the crossbeam disposed between the first lateral end portion and the second lateral end portion and configured to extend between the longitudinal side portions across at least a portion of the aperture, wherein the longitudinal side portions further comprise a drain channel and wherein the crossbeam bridges at least a portion of the drain channel,
    wherein at least one of the first, second, third, and fourth structures comprises a first surface formed from a first continuous fiber composite comprising a multidirectional laminate,
    wherein at least one of the first, second, third, and fourth structures comprises a second surface formed from a second continuous fiber composite comprising a unidirectional laminate, wherein the first surface and the second surface are selected to be formed from the first continuous fiber composite and the second continuous fiber composite, respectively, based at least upon a stress analysis for the respective surface, wherein the first surface exhibits a higher stress profile as compared to the second surface.

2. The roof frame of claim 1, wherein the crossbeam comprises the first surface.

3. The roof frame of claim 2, wherein the multidirectional laminate has between a ±30° and a ±60° laminate orientation.

4. The roof frame of claim 1, wherein the at least a portion of the roof panel comprises a cover member, the cover member comprising a metal sheet, a glass pane, or a fabric sheet.

5. The roof frame of claim 1, wherein the roof frame is overmolded using a two-step overmolding process comprising:
    forming the pair of longitudinal side portions, the first lateral end portion, and the second lateral end portion by:
    disposing a plurality of pieces of the first or second continuous fiber composite in an injection molding machine; and
    overmolding the plurality of pieces of the first or second continuous fiber composite with a polymeric resin to couple the plurality of pieces in the injection molding machine;
    independently forming the crossbeam; and
    attaching the crossbeam to the pair of longitudinal side portions.

6. The roof frame of claim 1, wherein the roof panel comprises a sun roof panel, a moon roof panel, or a hatch.

7. The roof frame of claim 1, wherein the at least a portion of the roof panel comprises a guide rail.

8. The roof frame of claim 1, wherein the first lateral end portion comprises a channel, the channel comprising two walls joined by a bottom surface.

9. A roof frame configured to support a roof panel, the roof frame comprising:
    a pair of longitudinal side portions, each of the longitudinal side portions comprising a first structure disposed on opposite sides of an aperture, the aperture configured to receive at least a portion of the roof panel;
    a first lateral end portion configured to be coupled between each of the longitudinal side portions, the first lateral end portion comprising a second structure disposed adjacent the aperture at a first end of the longitudinal side portions;
a second lateral end portion configured to be coupled between each of the longitudinal side portions, the second lateral end portion comprising a third structure disposed adjacent the aperture at a second end of the longitudinal side portions, opposite the first end; and
a crossbeam comprising a fourth structure, the crossbeam disposed between the first lateral end portion and the second lateral end portion and configured to extend between the longitudinal side portions across at least a portion of the aperture, wherein the longitudinal side portions further comprise a drain channel and wherein the crossbeam bridges the drain channel,
wherein at least one of the first, second, third, and fourth structures comprises a first surface formed from a first continuous fiber composite comprising a multidirectional laminate,
wherein at least one of the first, second, third, and fourth structures comprises a second surface formed from a second continuous fiber composite comprising a unidirectional laminate, wherein the first surface and the second surface are selected to be formed from the first continuous fiber composite and the second continuous fiber composite, respectively, based at least upon a stress analysis for the respective surface, wherein the first surface exhibits a higher stress profile as compared to the second surface.

10. The roof frame of claim 1, wherein the crossbeam has an omega-shaped profile.

11. A roof frame configured to support a roof panel, the roof frame comprising:
a pair of longitudinal side portions, each of the longitudinal side portions comprising a first support structure disposed on opposite sides of an aperture, the aperture configured to receive at least a portion of the roof panel;
a first lateral end portion configured to be coupled between each of the longitudinal side portions, the first lateral end portion comprising a second support structure disposed adjacent the aperture at a first end of the longitudinal side portions;
a second lateral end portion configured to be coupled between each of the longitudinal side portions, the second lateral end portion comprising a third support structure disposed adjacent the aperture at a second end of the longitudinal side portions, opposite the first end; and
a crossbeam comprising a fourth support structure, the crossbeam disposed between the first lateral end portion and the second lateral end portion and configured to extend between the longitudinal side portions across at least a portion of the aperture, wherein the longitudinal side portions further comprise a drain channel and wherein the crossbeam bridges at least a portion of the drain channel,
wherein at least one of the first, second, third, and fourth support structures comprises a first surface formed from a continuous fiber composite,
wherein at least one of the first, second, third, and fourth support structures comprises a second surface formed from a polymeric resin without continuous fiber reinforcement,
wherein the first surface and the second surface are selected to be formed from the continuous fiber composite and the polymeric resin without continuous fiber reinforcement, respectively, based at least upon a stress analysis for the respective surface, wherein the first surface exhibits a higher stress profile as compared to the second surface.

12. The roof frame of claim 11, wherein the roof frame is overmolded using a one-step overmolding process comprising:
disposing a plurality of pieces of the continuous fiber composite in an injection molding machine; and
overmolding the plurality of pieces of the continuous fiber composite with the polymeric resin to couple the plurality of pieces in the injection molding machine,
wherein at least one of the plurality of pieces comprises the crossbeam.

13. The roof frame of claim 11, wherein the roof frame is overmolded using a two-step overmolding process comprising:
forming the pair of longitudinal side portions, the first lateral end portion, and the second lateral end portion by:
disposing a plurality of pieces of the continuous fiber composite in an injection molding machine; and
overmolding the plurality of pieces of the continuous fiber composite with the polymeric resin to couple the plurality of pieces in the injection molding machine;
independently forming the crossbeam; and
attaching the crossbeam to the pair of longitudinal side portions.

14. The roof frame of claim 11, wherein the continuous fiber composite comprises carbon fibers or glass fibers, or a combination thereof.

15. The roof frame of claim 11, wherein the continuous fiber composite comprises a plurality of fibers and a matrix, the matrix formed from a first thermoplastic,
wherein the plurality of fibers are embedded in the matrix, and
wherein the polymeric resin is formed from a second thermoplastic.

16. The roof frame of claim 11, wherein the continuous fiber composite comprises unidirectional laminate.

17. The roof frame of claim 11, wherein the continuous fiber composite comprises multidirectional laminate.

18. A method of making the roof panel of claim 1, the method comprising determining a stress profile of one or more surfaces of the roof panel; and
selecting a process to form the one or more surfaces based at least on the determined stress profile.

* * * * *